United States Patent
Bandekar et al.

(10) Patent No.: US 10,955,833 B2
(45) Date of Patent: Mar. 23, 2021

(54) CLOUD BASED CONTROL FOR REMOTE ENGINEERING

(71) Applicant: Honeywell International Inc., Morris Plains, NJ (US)

(72) Inventors: Raj Bandekar, Lansdale, PA (US); Michael James Waynick, Hatboro, PA (US); Gary Drayton, King of Prussia, PA (US)

(73) Assignee: UOP LLC, Des Plaines, IL (US)

( * ) Notice: Subject to any disclaimer, the term of this patent is extended or adjusted under 35 U.S.C. 154(b) by 240 days.

(21) Appl. No.: 15/991,996

(22) Filed: May 29, 2018

(65) Prior Publication Data

US 2019/0369608 A1 Dec. 5, 2019

(51) Int. Cl.
*G05B 19/418* (2006.01)
*H04L 29/08* (2006.01)

(52) U.S. Cl.
CPC . *G05B 19/41885* (2013.01); *G05B 19/41835* (2013.01); *G05B 19/41855* (2013.01); *G05B 2219/25232* (2013.01); *H04L 67/125* (2013.01)

(58) Field of Classification Search
CPC .............................................. G05B 19/41885
See application file for complete search history.

(56) References Cited

U.S. PATENT DOCUMENTS

| | | | |
|---|---|---|---|
| 6,968,905 | B2 | 11/2005 | Adnan et al. |
| 2006/0058929 | A1 | 3/2006 | Fossen et al. |
| 2017/0098022 | A1 | 4/2017 | Kephart et al. |
| 2018/0113430 | A1 | 4/2018 | Naidoo et al. |

OTHER PUBLICATIONS

Notification of Transmittal of the International Search Report and Written Opinion of the International Searching Authority dated Sep. 12, 2019 7 Pages.
Raj Bandekar et al., "Virtual Unit Operations Controller", 2017 TCO Symposium, Oct. 2017, 25 pages.

*Primary Examiner* — Tejal Gami
(74) *Attorney, Agent, or Firm* — Paschall & Associates, LLC; James C. Paschall

(57) ABSTRACT

A method in an industrial process control and remote engineering system comprises receiving, by a remote control system, a control configuration, interfacing, by the remote control system, via a network, with at least one process equipment, and remotely controlling, by the remote control system, the at least one process equipment according to the control configuration. In some embodiments of the method, the remote control system is a twin of a local control system.

14 Claims, 2 Drawing Sheets

CLOUD BASED CONTROL FOR REMOTE ENGINEERING

TECHNICAL FIELD

This disclosure relates generally to industrial process control and automation systems. More specifically, this disclosure relates to systems and methods for remotely controlling process equipment.

BACKGROUND

Industrial process control and automation systems are routinely used to automate large and complex industrial processes. These types of systems typically include sensors, actuators, and controllers, and include algorithms and control configurations created to control and monitor the system. Typically, process equipment from multiple manufacturers is used in any given process in an industrial plant. Equipment from disparate manufacturers is typically brought together on the plant site and connected to controllers in order to validate control configurations using the equipment.

SUMMARY

This disclosure provides systems and methods for remotely controlling and remotely engineering process equipment.

In a first embodiment, a method includes receiving, by a remote control system, a control configuration, interfacing, by the remote control system, via a network, with at least one process equipment, and remotely controlling, by the remote control system, the at least one process equipment according to the control configuration. In some embodiments of the method, the remote control system is a twin of a local control system.

In a second embodiment, a system includes at least one process equipment and a remote control system interfaced with the at least one process equipment via a network. The remote control system is configured to receive a control configuration and remotely control the at least one process equipment according to the control configuration. The remote control system of the system is a twin of a local control system.

In a third embodiment, a non-transitory computer readable medium embodies a computer program, and the computer program includes computer readable program code that when executed causes at least one processing device of a remote control system to receive a control configuration, interface, via a network, with at least one process equipment, and remotely control the at least one process equipment according to the control configuration. The remote control system of the system is a twin of a local control system.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
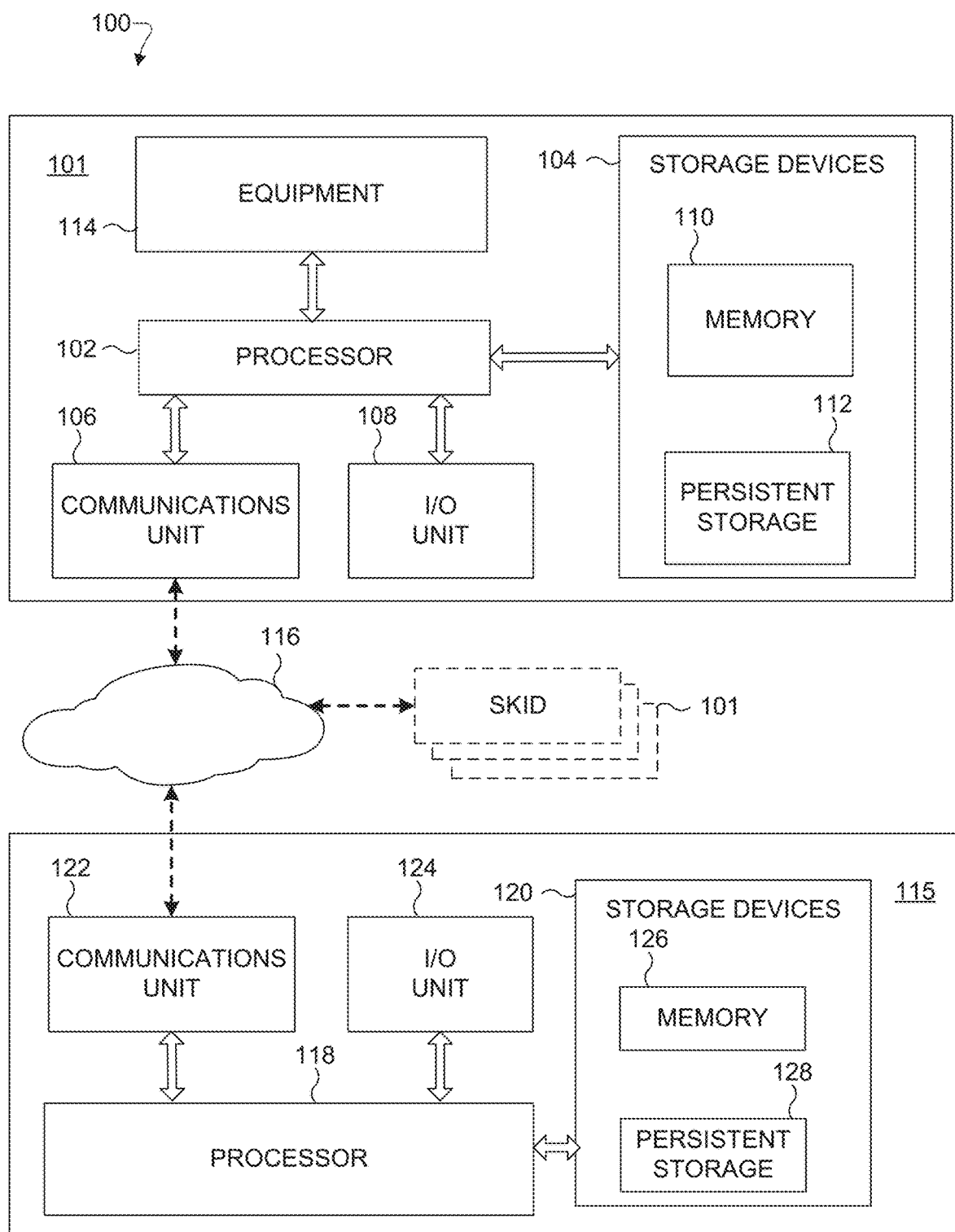
FIG. 1 illustrates an example industrial process control and remote engineering system according to this disclosure.
Figure 2:
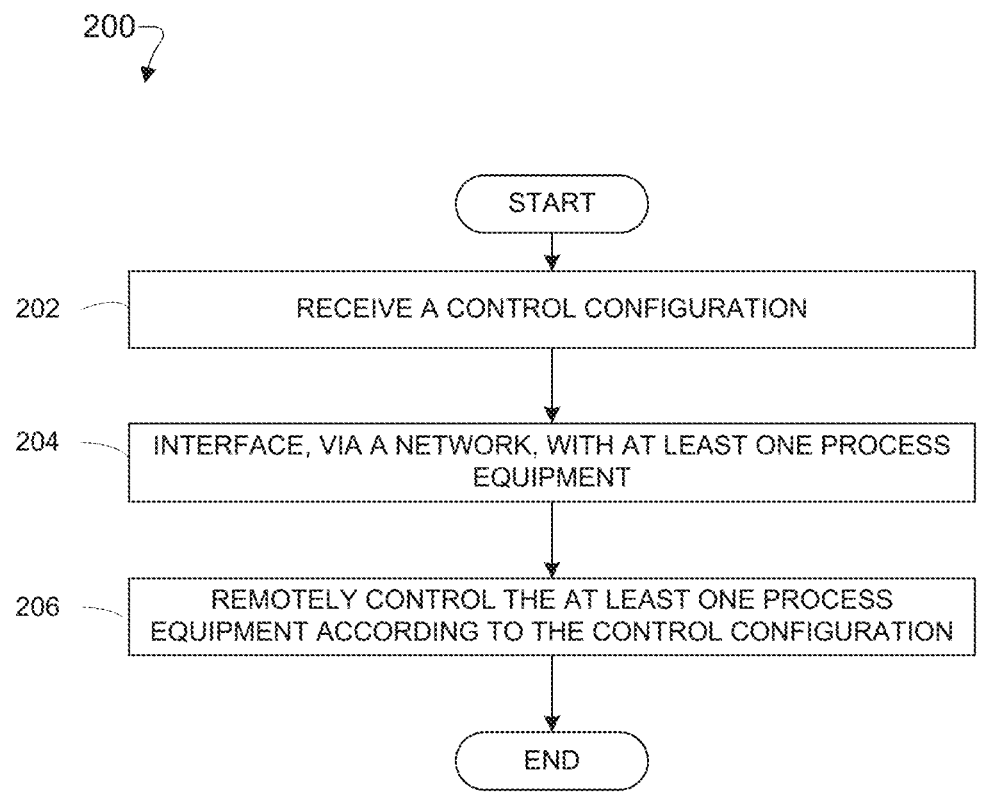
FIG. 2 illustrates an example method for remote control and remote engineering according to this disclosure.

FIGS. 1 and 2, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of the present disclosure contemplate that industrial process control systems often are built with equipment pieces that are manufactured by and purchased from multiple disparate third party vendors. Such process equipment may be referred to as skids or packages, and may be very large and difficult to transport. For example, a skid could include a centrifuge, a motor control center, a compressor monitor, or the like. Although each third party skid may be designed to be compatible with control system components from other vendors, such as a distributed control system (DCS), it is still necessary to connect a DCS to the skid to test and validate controls before a process can be brought online. Typically this involves purchasing all of the required skids from various original electronics manufacturers (OEMs) and shipping them to a site where the process will be implemented, such as an industrial plant. Once on-site, the skids can be connected to the DCS and tested. This is costly in both time and resources, as there may be a delay before the skid arrives at the final site (thus slowing down the validation process), and the cost to return a skid if a fault is found can be high.

Accordingly, embodiments of the present disclosure contemplate a remote implementation of a control system, such as a DCS, that allows OEM skids to be remotely interfaced with the control system components for validation at the OEM's manufacturing facility before the skid is transported to the final site. For example, a DCS could be implemented in a cloud architecture, and a communication protocol (e.g., IP, ethernet-based protocols such as PROFINET or ETHERNET/IP, or any other appropriate protocol) could be used by a skid to interface with the DCS as if it were locally connected. The skid can include multiple inputs/outputs (I/O) that are intended to connect to a DCS as well as to other process components. I/Os may be connected through an appropriate protocol to the DCS for both control I/Os as well as for process variable simulation I/Os that would normally be connected to other process equipment. In some embodiments, the skid includes local controllers (such as programmable logic controllers (PLCs)) that operate alongside the remote interface to the DCS to perform the control functions of the skid.

The validation obtained from this arrangement could satisfy regulatory requirements and allow for the skid to be installed at the process site without further validation (such as a factory acceptance test, a site acceptance test, or an installation qualification). In some embodiments, such a remote DCS arrangement can also be used to control a live process environment if network conditions are appropriate (e.g., if latency is low enough).

In embodiments of the present disclosure, control system components implemented remotely are an exact replica of local control system components. Accordingly, control configurations designed on and validated on remote control system components can be moved onto local control system components (such as a DCS on the plant site) without any further modification or validation. The remote control system components could, in some embodiments, include a control execution environment (CEE) running in a virtual environment, such as a virtualized LINUX environment.

FIG. 1 illustrates an example industrial process control and remote engineering system 100 according to this disclosure. The system 100 includes a skid 101 and a control system 115, which could be a DCS. Although only one skid 101 is illustrated, any number of skids could be present in the system 100.

As shown in FIG. 1, the skid 101 includes at least one processor 102, at least one storage device 104, at least one communications unit 106, at least one input/output (I/O) unit 108, and in some embodiments, at least one industrial process equipment 114. Each processor 102 can execute instructions, such as those that may be loaded into a memory 110. Each processor 102 denotes any suitable processing device, such as one or more microprocessors, microcontrollers, digital signal processors, application specific integrated circuits (ASICs), field programmable gate arrays (FPGAs), or discrete circuitry. In some embodiments, the processor 102 could be a programmable logic controller (PLC).

The memory 110 and a persistent storage 112 are examples of storage devices 104, which represent any structure(s) capable of storing and facilitating retrieval of information (such as data, program code, and/or other suitable information on a temporary or permanent basis). The memory 110 may represent a random access memory, a buffer or cache, or any other suitable volatile or non-volatile storage device(s). The persistent storage 112 may contain one or more components or devices supporting longer-term storage of data, such as a read only memory, hard drive, Flash memory, or optical disc.

The communications unit 106 supports communications with other systems or devices. For example, the communications unit 106 could include at least one network interface card or wireless transceiver facilitating communications over at least one wired or wireless network. The communications unit 106 may support communications through any suitable physical or wireless communication link(s). In some embodiments, the communications unit 106 interfaces with a network 116 through any suitable communication link(s), and facilitates communication with devices such as the control system 115 though this connection.

The I/O unit 108 allows for input and output of data. For example, the I/O unit 108 may provide a connection for user input through a keyboard, mouse, keypad, touchscreen, or other suitable input device. The I/O unit 108 may also send output to a display, printer, or other suitable output device. The I/O unit 108 could also interface with other process equipment in an industrial process system, including sensors and other locally connected controllers.

The process equipment 114 can perform a function in an industrial process, such as centrifuging. In some embodiments, the processor 102 is a PLC interfaced with the process equipment 114 for the purposes of controlling the process equipment 114, and the other components of the skid 101 facilitate these controls, such as by storing a control configuration in the storage devices 104. In some embodiments, the equipment 114 is connected to the processor 102 through the I/O unit 108.

As shown in FIG. 1, the control system 115 also includes at least one processor 118, at least one storage device 120, at least one communications unit 122, and at least one input/output (I/O) unit 124. Each processor 118 can execute instructions, such as those that may be loaded into a memory 126. Each processor 118 denotes any suitable processing device, such as one or more microprocessors, microcontrollers, digital signal processors, application specific integrated circuits (ASICs), field programmable gate arrays (FPGAs), or discrete circuitry. In some embodiments, the control system 115 is a DCS.

The memory 126 and a persistent storage 128 are examples of storage devices 120, which represent any structure(s) capable of storing and facilitating retrieval of information (such as data, program code, and/or other suitable information on a temporary or permanent basis). The memory 126 may represent a random access memory, a buffer or cache, or any other suitable volatile or non-volatile storage device(s). The persistent storage 128 may contain one or more components or devices supporting longer-term storage of data, such as a read only memory, hard drive, Flash memory, or optical disc.

The communications unit 122 supports communications with other systems or devices. For example, the communications unit 122 could include at least one network interface card or wireless transceiver facilitating communications over at least one wired or wireless network. The communications unit 122 may support communications through any suitable physical or wireless communication link(s). In some embodiments, the communications unit 122 interfaces with a network 116 through any suitable communication link(s), and facilitates communication with one or more skids 101 through this connection.

The I/O unit 124 allows for input and output of data. For example, the I/O unit 124 may provide a connection for user input through a keyboard, mouse, keypad, touchscreen, or other suitable input device. The I/O unit 124 may also send output to a display, printer, or other suitable output device. The I/O unit 124 could also interface with other process equipment in an industrial process system, including sensors and other locally connected controllers.

In some embodiments, the control system 115 is a general purpose computer that is emulating the functionality of a DCS. In such an embodiment, to any devices, such as skids 101, that the control system 115 interfaces with, the control system 115 appears identical to a local DCS. That is, the control system 115 is a "twin" of a local DCS. Accordingly, the remotely connected control system 115 can be used to perform a validation test on a control configuration designed to run on the control system 115 (i.e., on a DCS) to control a skid 101. The validated control configuration can then be moved from the control system 115 to a local DCS on a process site without further validation. For example, a factory acceptance test or installation qualification could be performed while the control system 115 is remotely connected to a skid 101, and the factory acceptance or installation qualification test would not need to be repeated once the skid is physically moved to the final process site and connected to the local DCS.

As illustrated in FIG. 1, any number of skids 101 could be connected to the control system 115 through the network 116. In this way, the control system 115 can interface with different skids 101 that are part of a designed industrial process in order to remotely validate control configurations for use on one or more of the skids 101. In some embodiments, the combination of skids 101 and the control system 115, all remotely connected from varying physical locations, could simulate an entire industrial process for validation purposes before the skids 101 are physically moved to a same site as a DCS that will be used to control them, where the DCS is functionally identical to the control system 115. For example, a validation procedure such as a factory acceptance test or installation qualification could be performed while the control system 115 is remotely connected to the skids 101, and the validation procedure would not need to be repeated once the skids are all physically moved to the final process site and connected to the DCS. In some embodiments, the control system 115 could also remain remotely located and connected to an entire industrial process system through the network 116 to provide live control remotely to the industrial process. That is, the control system 115 could replace a local DCS to control the functioning of the industrial process system.

Although FIG. 1 illustrates one example of an industrial process control and remote engineering system 100, various changes may be made to FIG. 1. For example, various components in FIG. 1 could be combined, further subdivided, rearranged, or omitted and additional components could be added according to particular needs. Also, skids and control systems come in a wide variety of configurations, and FIG. 1 does not limit this disclosure to any particular configuration of skid or control system.

FIG. 2 illustrates an example method 200 for remote control and remote engineering according to this disclosure. For ease of explanation, the method 200 is described with respect to the system 100 of FIG. 1, although the method 200 could be implemented in any other suitable system.

At step 202, a remote control system receives a control configuration for one or more pieces of process equipment. For example a user could design a control configuration on the remote control system, or a control configuration could be loaded through an I/O interface (such as a USB interface) or through a network. The remote control system is, in this embodiment, a "twin" of a local control system, such as a local DCS.

At step 204, the remote control system interfaces, via a network, with the process equipment. The remote control system could interface with the process equipment using a peer-to-peer (P2P) connection protocol, an internet protocol (IP), any ethernet-based protocol (such as PROFINET or ETHERNET/IP), or any other suitable connection protocol. In some embodiments, the process equipment is part of a skid, which could also include other components, such as local controllers (e.g., PLCs). The remote control system could be located, for example, at the site of a manufacturer of the remote control system, and the process equipment could be located at the site of a manufacturer of the process equipment.

At step 206, the remote control system remotely controls the process equipment according to the control configuration received at step 202. This could include performing a validation test (such as a factory or site acceptance test). When the remote control system is a twin of a local DCS that will be used with the process equipment at a process site, such a validation test is sufficient to validate the control configuration for use with the local DCS and the process equipment. Performing such a validation test can include generating simulated values of process variables (e.g., process variables that would be generated by other process equipment in a final process installation) and transmitting the simulated values to the process equipment to be treated as process variable inputs.

Although FIG. 2 illustrates one example of a method 200 for remote control and remote engineering, various changes may be made to FIG. 2. For example, while shown as a series of steps, various steps in FIG. 2 could overlap, occur in parallel, or occur any number of times.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, by a remote control system, a control configuration;
   interfacing, by the remote control system, via a network, with at least one process equipment, the at least one process equipment is part of a skid that includes at least one local controller that is interfaced with the at least one process equipment; and
   remotely controlling, by the remote control system, the at least one process equipment according to the control configuration, wherein remotely controlling the at least one process equipment further comprises performing a validation test on the control configuration for the remote control system and the at least one process equipment, including generating simulated values of process variables by process equipment in a final process installation, and wherein the remote control system is a twin of a local control system;
   moving the validated control configuration from the remote control system to the local control system on a process site without further validation; and
   transmitting the simulated values to the local controller of the at least one process equipment to be treated as process variable inputs.

2. The method of claim 1, wherein the validation test is also valid for the local control system.

3. The method of claim 1, wherein the remote control system is a virtual distributed control system (DCS) and the local control system is an local DCS.

4. The method of claim 1, wherein:
   the remote control system is located at a physical site of a manufacturer of the remote control system or at an industrial process site, and
   the at least one process equipment is located at another physical site.

5. The method of claim 1, wherein the remote control system replaces functionality of the local control system during a live process operation.

6. A system, comprising:
   at least one process equipment; and
   a remote control system interfaced with the at least one process equipment via a network, the at least one process equipment is part of a skid that includes at least one local controller that is interfaced with the at least one process equipment, the remote control system configured to:
      receive a control configuration; and
      remotely control the at least one process equipment according to the control configuration, wherein remotely control the at least one process equipment further comprises performing a validation test on the control configuration for the remote control system and the at least one process equipment, including generating simulated values of process variables by process equipment in a final process installation, and wherein the remote control system is a twin of a local control system;
      move the validated control configuration from the remote control system to the local control system on a process site without further validation; and
      transmit the simulated values to the local controller of the at least one process equipment to be treated as process variable inputs.

7. The system of claim 6, wherein the validation test is also valid for the local control system.

8. The system of claim 6, wherein the remote control system is a virtual distributed control system (DCS) and the local control system is a local DCS.

9. The system of claim 6, wherein:
   the remote control system is located at a site of a manufacturer of the remote control system or at an industrial process site, and
   the at least one process equipment is located at another physical site.

10. The system of claim 6, wherein the remote control system is further configured to replace functionality of the local control system during a live process operation.

11. A non-transitory computer readable medium containing instructions that, when executed by at least one processing device of a remote control system, cause the at least one processing device to:
   receive a control configuration;
   interface, via a network, with at least one process equipment, the at least one process equipment is part of a skid that includes at least one local controller that is interfaced with the at least one process equipment; and
   remotely control the at least one process equipment according to the control configuration, wherein remotely control the at least one process equipment further comprises performing a validation test on the control configuration for the remote control system and the at least one process equipment, including generating simulated values of process variables by process equipment in a final process installation, and wherein the remote control system is a twin of a local control system;
   move the validated control configuration from the remote control system to the local control system on a process site without further validation; and
   transmit the simulated values to the local controller of the at least one process equipment to be treated as process variable inputs.

12. The non-transitory computer readable medium of claim 11, wherein the instructions that cause the at least one processing device to remotely control the at least one process equipment further cause the at least one processing device to:
   wherein the validation test is also valid for the local control system.

13. The non-transitory computer readable medium of claim 11, wherein the instructions further cause the at least one processing device to replace functionality of the local control system during a live process operation.

14. The non-transitory computer readable medium of claim 11, wherein:
   the remote control system is located at a site of a manufacturer of the remote control system or at an industrial process site, and the at least one process equipment is located at another physical site.

\* \* \* \* \*